United States Patent [19]
Holwerda

[11] Patent Number: 5,557,078
[45] Date of Patent: Sep. 17, 1996

[54] ACOUSTICAL BARRIER

[75] Inventor: Matthew J. Holwerda, Hudsonville, Mich.

[73] Assignee: Cascade Engineering, Inc., Grand Rapids, Mich.

[21] Appl. No.: 306,021

[22] Filed: Sep. 14, 1994

[51] Int. Cl.$^6$ ........................................ F16F 15/00
[52] U.S. Cl. ........................... 181/208; 248/56
[58] Field of Search ........................... 181/200, 202, 181/205, 208, 290, 293; 248/56, 111; 277/212 C, 212 F; 285/192, 200

[56] References Cited

U.S. PATENT DOCUMENTS

| | | |
|---|---|---|
| 3,162,412 | 12/1964 | McEntire . |
| 3,365,761 | 1/1968 | Kalvig . |
| 3,732,746 | 5/1973 | Fitzpatrick ........................ 181/200 X |
| 3,881,752 | 5/1975 | Fujishima . |
| 4,237,998 | 12/1980 | Matayoshi ........................ 181/200 X |
| 4,717,385 | 1/1988 | Cameron et al. . |
| 4,750,411 | 6/1988 | Eversole . |
| 5,243,153 | 9/1993 | Holwerda . |
| 5,403,976 | 4/1995 | Maurice ........................ 248/56 X |

*Primary Examiner*—Khanh Dang
*Attorney, Agent, or Firm*—Varnum, Riddering, Schmidt & Howlett LLP

[57] ABSTRACT

An acoustical barrier having a central aperture that is defined by a flexible seal. The acoustical barrier has an inwardly directed flange circumscribing of the central aperture and spacing the mass layer from a wall a predetermined distance. The wall has an aperture in which is disposed a moisture seal through which a pass-through component extending from one side of the wall to another side of the wall is positioned. The pass-through component is mounted to an article that is disposed within the central aperture of the acoustical barrier. The flexible seal is positioned away from the moisture seal and blocks the transfer of acoustical noise from one side of the wall to the other.

16 Claims, 2 Drawing Sheets

ACOUSTICAL BARRIER

BACKGROUND OF THE INVENTION

1. Field of the Invention

This invention relates to an acoustical barrier, and more specifically to an acoustical barrier having a flexible seal through which connectors, modules and the like can pass.

2. Description of the Related Art

Articles, such as steering columns, blower attachments, brackets, electrical and mechanical cables, are commonly passed through an aperture in barrier walls of vehicles and other structures. It is desirable to block the transfer of sound through the wall from the engine compartment into the passenger compartment. A moisture seal is disposed in the opening between the wall and the cable or column to prevent moisture from passing from one side of the wall to another. Typically, a foam insulation layer and a mass layer have been mounted to the wall. Openings in the mass layer for the cable or articles mounted to the wall have been defined by a support rib which extends from an edge of the mass layer opening to the wall.

The acoustical barrier must be capable of adapting to tubes, wires and components of different diameters and cross-sectional shapes. Preferably, the acoustical barrier conforms exactly to the shape of the tube, wire or component. An acoustical barrier for an automobile HVAC unit has previously been formed in an aperture for tubing in an acoustical panel by forming in the panel radially extending, triangular sectors defined by radial slits originating from a large central aperture to radially spaced apertures. The sectors can generally conform to the shape of a tube or cable passing through the aperture defined by the ends of the radially extending sectors by the deflection of the sectors. See U.S. Pat. No. 5,243,153 to Holwerda, issued Sep. 7, 1993. Other seals for tubing in other environments are disclosed in U.S. Pat. Nos. 3,365,761 to Kalvig, issued Jan. 30, 1968; and 3,162,412 to McEntire, issued Dec. 22, 1964. The radial sectors of these references help to conform the aperture to the size of the tube or wire. However, the radially extending slots and the originating apertures provide for the uninhibited transfer of sound from one side of the acoustical barrier to the other and retard the effectiveness of the acoustical barrier.

U.S. Pat. No. 3,881,752 to Fujishima, issued May 6, 1975, discloses a generally circular resilient plastic sheet having an undersized central aperture that is slidably mounted onto a pipe so that the strain resulting from the stretching of the aperture elongates the sheet around the pipe into a cone-shape. The plastic sheet is moved along the pipe so that the end of the plastic sheet abuts the wall through which the pipe passes. The tightly drawn plastic sheet can act as a diaphragm to transmit noise passing through the aperture in the wall, thereby retarding the acoustic sealing properties of the plastic sheet.

Although the previous devices all attempted to provide an acoustical barrier for tubes or cable passing through an aperture in a wall, all of the previous acoustical barriers have one or more undesirable characteristics. Further, all of the previous acoustical barriers failed to suitably perform both as an acoustical barrier.

SUMMARY OF INVENTION

The invention relates to an acoustical barrier for a wall with a component passing through the wall. The acoustical barrier is adapted to be mounted to a wall having one or more openings therethrough. An article is mounted adjacent one side of the wall and has a pass-through component, which extends from article, through the opening in the wall and to the other side of the wall. A moisture seal is typically disposed between the opening of the wall and the pass-through component and provides a moisture seal around the pass-through component to aid in reducing the transfer of moisture from one side of the wall to the other side of the wall. The acoustical barrier comprises a mass layer adapted to be mounted adjacent the wall and to cover the wall. The mass layer has one or more openings to accept components or cables. A support rib defines the opening in the mass layer and extends at a substantially right angle to the mass layer on one side. Acoustical foam is mounted to the one side of the mass layer and has openings conforming to the opening or openings in the mass layer. The acoustical foam openings receive the supporting rib of the mass layer to aid in retaining the acoustical foam layer and the mass layer. A flexible seal extends inwardly from the opening or openings in the mass layer to conformably contact the component to provide an acoustical seal between opposite sides of the wall.

Preferably, the flexible seal comprises a plurality of flexible flaps, which are separated from each other by slots. The flexible flaps are resilient and bear against the article to form the acoustical seal between opposite sides of the wall.

The mass layer conforms in shape to the shape of the wall or the interior of the vehicle and is formed from an injection molded thermoplastic material. Filled thermoplastic olefin is a suitable thermoplastic polymer for the mass layer.

DESCRIPTION OF THE PREFERRED EMBODIMENT

Figure 1:
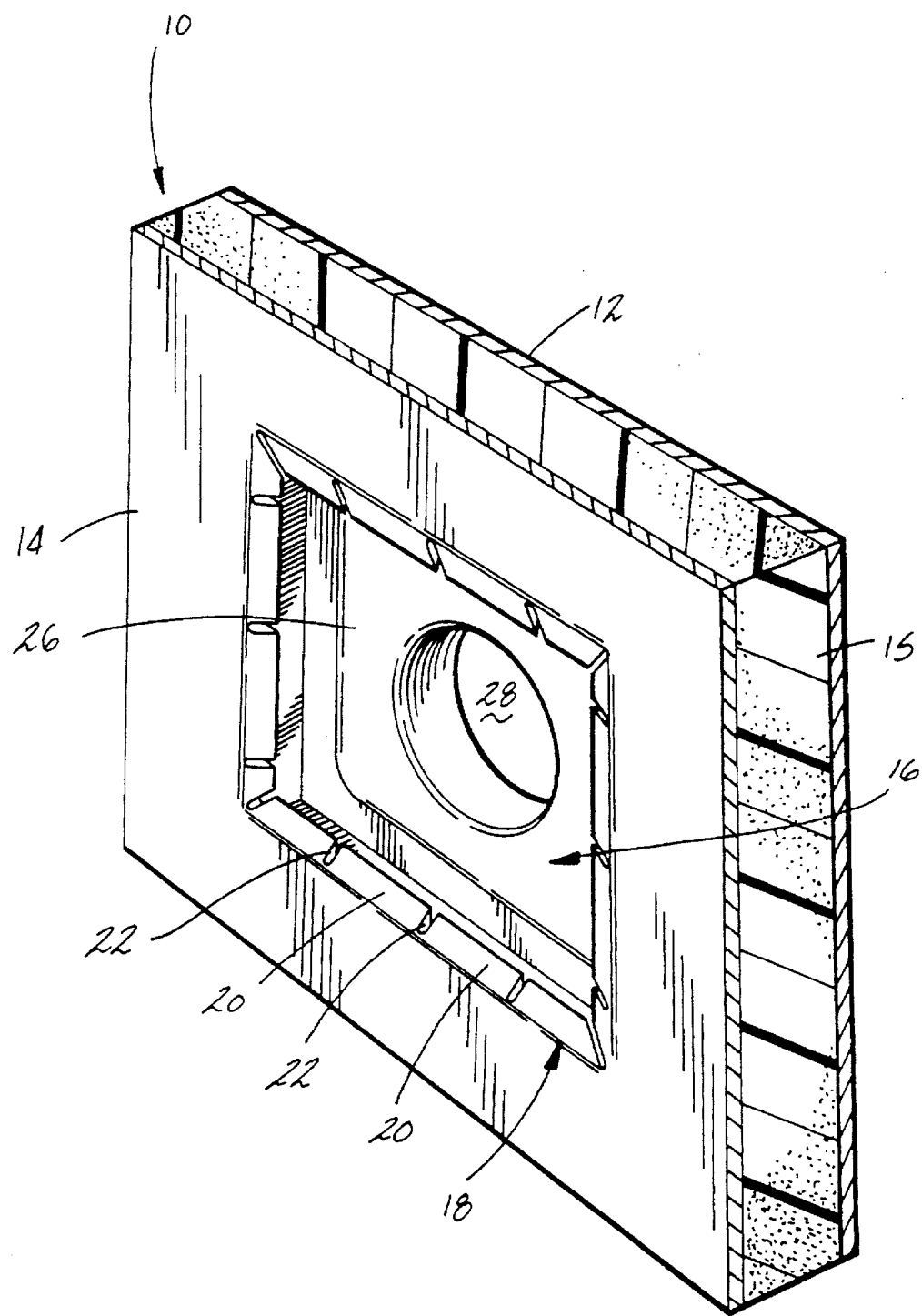
FIG. 1 is a sectional perspective view of the acoustical barrier according to the invention mounted to a wall.
Figure 2:
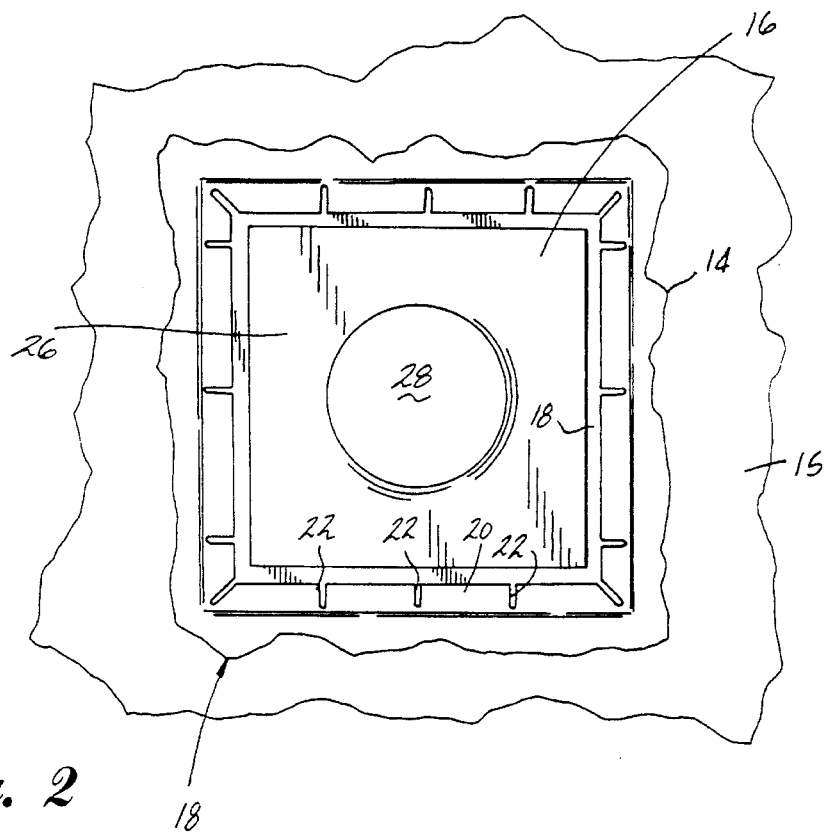
FIG. 2 is a front view of the acoustical barrier of FIG. 1.
Figure 3:
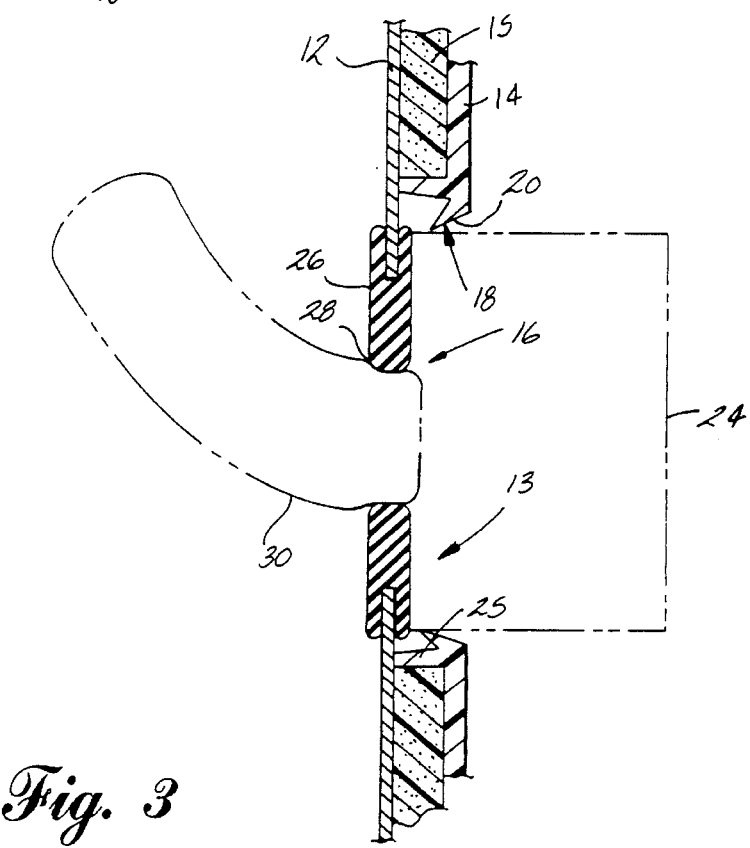
FIG. 3 is a sectional view along line 3—3 of FIG. 2 with a component and pass-through component positioned within the acoustical barrier and mounted to a structural wall.

FIGS. 1–3 illustrate the acoustical barrier 10 according to the invention mounted to a wall. The acoustical barrier is preferably used in a vehicle to reduce or eliminate the transfer of acoustical noise from the engine compartment to the passenger compartment. The acoustical barrier 10 is generally formed of an acoustical foam layer 15 and a mass layer 14. The acoustical barrier is adapted to be mounted to a wall 12 which has one or more openings through which pass cables and the like. The foam 15 and mass layer 14 are typically large sheets that are substantially the same size and are mounted to the wall 12 to cover the wall. In an automotive installation, the wall 12 forms a structural metal barrier between the engine and passenger compartments. The mass layer 14 and the foam layer 15 are at least co-extensive with the metal barrier wall 12 and can extend further to cover the wheel well walls as well. Only a portion of the sheets are illustrated in FIGS. 1–3.

The wall. 12 is typically made from sheet metal and separates the engine compartment (on the left side of wall 12 in FIG. 1) from the passenger compartment (on the right side of wall 12 in FIG. 1). Unfortunately, the sheet metal readily transfers sound. The acoustical foam 15 and mass layer 14 have sound dampening and sound absorbing properties to reduce or eliminate the transfer of sound from the engine compartment to the passenger compartment. The acoustical foam layer 15 decouples the mass layer 14 from the wall 12.

The wall 12 can have one or more openings, such as wall aperture 13, through which components, such as pass-through component 30, pass from one side of the wall to another. The pass-through component 30 is typically a conduit, such as a hose, cable, or wiring, connecting an engine compartment system to a component 24. For example, the pass-through component can be an electrical wire bundle and cable bundle connected to the HVAC control, the, steering column, or an electronic device. In like manner, the mass layer 14 and the foam layer 15 have one or more openings 16, 17, respectively, in registry with the apertures 13 in the wall 12.

The pass-through component 30 extends through the wall aperture 13 and an opening 16 in the mass layer 14. The opening 16 is defined by a support rib 25, which is integrally molded with the mass layer 14 and extends inwardly toward the wall 12 from the mass layer 14. The support rib 25 is press fit into a foam aperture 17 in the acoustic foam 15, which aids in mounting the acoustic foam layer 15 to the mass layer 14.

A flexible seal 18 is integrally molded with the mass layer 14 and extends into the opening 16. The flexible seal 18 has multiple flaps 20 separated by slots 22, which abut the sides of the component 24. The mass layer 14 is preferably injection molded from a moldable resilient or flexible synthetic plastic material, such as a barium sulfate filled polypropylene.

The foam layer 15 spaces the mass layer 14 a predetermined distance from the wall 12. Support rib 25 extends toward the wall 12 at approximately a right angle with respect to the mass layer 14 and circumscribes the opening 16 to box in the wall aperture 13 and the pass-through component. Preferably, the support rib 25 is continuous and completely encircles the wall aperture 13. However, the support rib can be discontinuous.

Although the opening 16 is illustrated as having a generally square or rectangular shape, it can have any shape, depending on the requirements of the particular application and the shape of the article 24.

The article 24, such as an electrical control box for a vehicle, is disposed within the opening 16 so that the flaps 20 of the flexible seal 18 abut the sides of the article 24 and are directed inwardly toward the wall 12 upon the mounting of the article 24. The article 24 is adjacent a fluid seal 26 mounted to the wall 12. The fluid seal 26 defines a component aperture 28 through which the pass-through component 30 extends from the article 24 to the other side of the wall 12. Preferably, the diameter of the component aperture 28 is sufficiently smaller than the diameter of the pass-through component 30 so that the fluid seal 26 envelopes the pass-through component 30 and is in liquid-tight engagement with the pass-through component 30 to prevent the transfer of fluid, such as moisture, from one side of the wall to another. The fluid seal 26 is preferably made from a suitable resilient elastomeric material.

The seal 18 is preferably disposed a sufficient distance from the wall 12 by the support rib 25 so that the flaps 20 do not contact the fluid seal 26 when the flaps 20 are flexed inwardly by the mounting of the article 24. Typically, the distance between the mass layer 14 and the wall 12 is between 5 and 50 millimeters. The separation between the mass layer 14 and the wall 12 increases the effectiveness of the acoustical barrier 10 by blocking the transfer of acoustical vibrations from the fluid seal 26 directly to the acoustical barrier 10 via the flexible seal 18.

To construct the acoustical barrier 10 according to the invention, the acoustical barrier 10 is secured to the wall 12 by first mounting the foam layer 15 in the acoustical barrier 10 and then aligning the opening 16 with the wall aperture 13 and pressing the mass layer toward the wall 12 until the support rib 25 contacts the wall 12. Typically, the article 24 and the pass-through component is mounted to the wall 12 after mounting of the acoustical barrier 10 to the wall panel 12. The fluid seal 26 is also put in place after mounting the acoustical barrier 10 to the wall. As the article 24 is pushed into place, the sides of the article 24 contact the flaps 20 of the flexible seal 18 deflect the flaps 20. The article 24, fluid seal 26 and pass-through component 30 can be preassembled and installed as a unit.

The fluid seal 26 can transmit some acoustical vibrations from one side of the wall 12 to the other side of the wall 12. Therefore, it is important that the flexible seal 18 does not contact the fluid seal 26 to prevent the transfer of the acoustical vibrations directly from the fluid seal 26 through the flexible seal 18. The separation between the flexible seal 18 and the fluid seal 26 provides a dead space for decoupling the acoustical vibrations passing through the fluid seal 26. Thus, the acoustical barrier 10 contacts the periphery of the article 24 to acoustically seal the component with respect to the wall 12 and the fluid seal 26.

The invention provides an acoustical barrier that is substantially better than previous acoustical barriers because the acoustical barrier substantially seals the otherwise open area around the article 24 to reduce the transfer of sound through the opening 13 in the wall and around the article 24. The acoustical barrier 10 further reduces the transfer of noise by sealing the article 24 with respect to the wall 12 to reduce or eliminate the noise transmitted through the fluid seal 26.

Reasonable variation and modification are possible within the spirit of the foregoing disclosure and drawings without departing from the scope of the invention. For example, the use of the acoustical barrier is not limited to an automobile, but can be used in many different applications, including building construction or any other application in which a structural or nonstructural element passes through a wall-like member.

I claim:

1. In a wall having an opening therethrough, an article mounted on one side of the wall and having a pass-through component extending from the article and through the opening in the wall to the other side thereof; a moisture seal in the opening in the wall providing a moisture seal around the pass-through component; a mass layer of generally planar configuration positioned adjacent the wall and having an outer planar surface, the mass layer further having a support rib defining an opening in the mass layer in registry with the wall opening and surrounding the article, the support rib extending laterally of the outer planar surface toward the wall; an acoustical foam layer mounted to one side of the wall between the mass layer and the wall and having an opening in which the supporting rib is received and in registry with the wall openly; the improvement which comprises:

the mass layer further having a flexible seal extending inwardly into the mass layer opening from an edge thereof in contact with the article to provide an acoustical seal around the article.

2. A wall according to claim 1 wherein the flexible seal comprises a plurality of flexible flaps which are separated from each other by slots.

3. A wall according to claim 2 wherein a flexible flaps are resilient and resiliently bear against the article.

4. A wall according to claim 3 wherein the flexible seal conforms to the periphery of the article.

5. A wall according to claim 4 wherein the terminal end of the flexible seal is spaced from the moisture seal.

6. A wall according to claim 1 wherein the mass layer is formed of an injection molded plastic material.

7. A wall according to claim 1 wherein a terminal end of the flexible seal is spaced from the moisture seal.

8. A wall according to claim 1 wherein the flexible seal is spaced from the wall a predetermined distance so that the flexible seal does not contact the moisture seal.

9. A wall according to claim 8 wherein the predetermined distance is between 5 and 50 millimeters.

10. A wall according to claim 1 wherein the flexible seal conforms to the periphery of the article.

11. A wall according to claim 2 wherein the flexible flaps are resilient and resiliently bear against the article.

12. An acoustical barrier for mounting to a wall having an opening therethrough, wherein an article is mounted on one side of the wall and has a pass-through component extending from the article through the opening of the wall to the other side thereof, the acoustical barrier comprising:

a mass layer of generally planar configuration and having an inner planar surface, the mass layer further having a support rib defining an opening in the mass layer adapted to register with the wall opening, the support rib extending laterally of the inner planar surface;

an acoustical foam layer positioned adjacent to the inner planar surface of the mass layer, having an opening in which the support rib is received and in registry with the opening in the mass layer, and the mass layer further having a flexible seal extending inwardly from an edge of the mass layer opening and adapted to contact an article mounted in the mass layer opening to provide an acoustical seal around the article.

13. An acoustical barrier according to claim 12 wherein the flexible seal comprises a plurality of flexible flaps, which are separated from each other by slots.

14. An acoustical barrier according to claim 13 wherein the flexible flaps are resilient and are adapted to resiliently bear against the article.

15. An acoustical barrier according to claim 14 wherein the flexible seal is adapted to conform to the periphery of the article.

16. An acoustical barrier according to claim 12 wherein the flexible seal is adapted to conform to the periphery of the article.

* * * * *